March 14, 1939.  S. SORENSEN  2,150,254
VALVE
Filed May 17, 1937
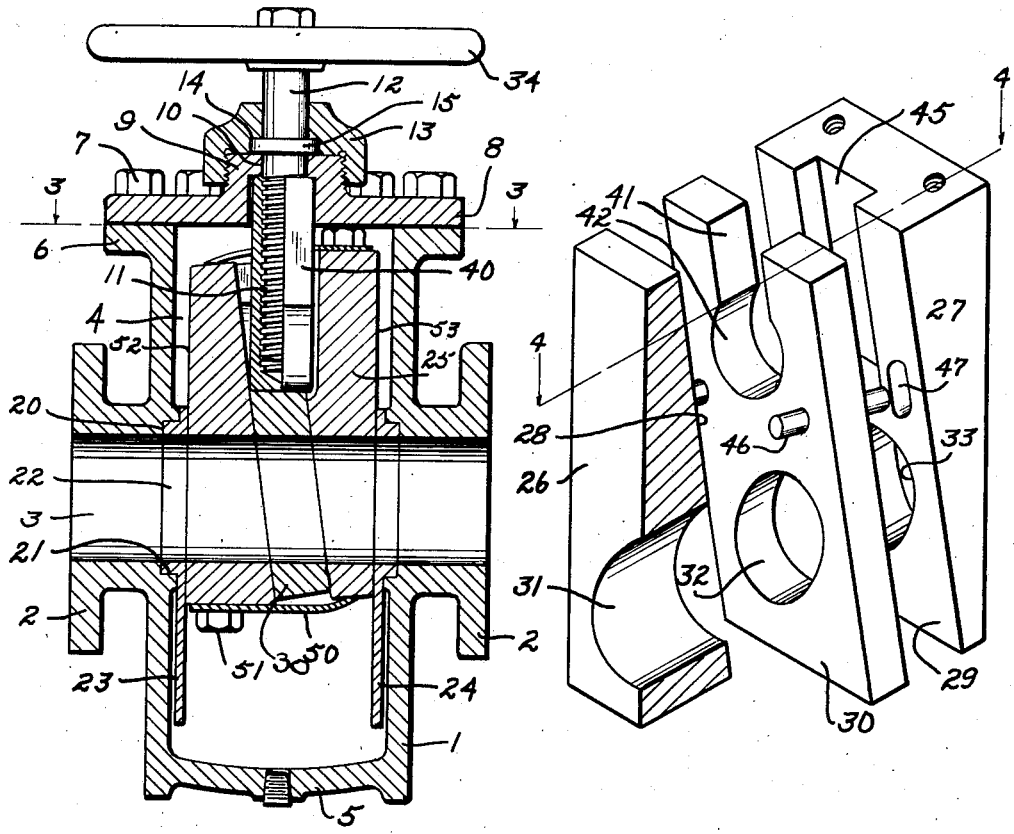
Fig. 1
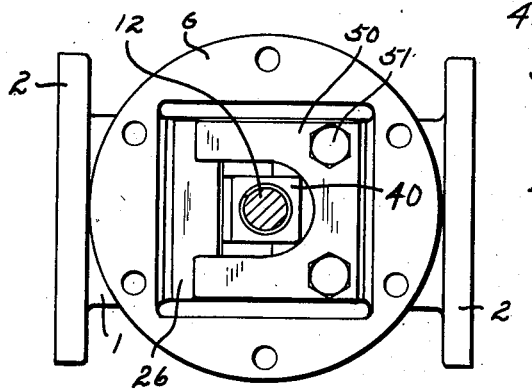
Fig. 3
Fig. 2
Fig. 4
INVENTOR.
SAM SORENSEN
BY Jesse R. Stone
Lester B. Clark
ATTORNEYS.

Patented Mar. 14, 1939

2,150,254

UNITED STATES PATENT OFFICE 2,150,254

VALVE

Sam Sorensen, Houston, Tex.

Application May 17, 1937, Serial No. 143,061

4 Claims. (Cl. 251—68)

The invention relates to valves and more particularly to the type of valves known as straightway or gate valves.

It is an object of the invention to provide a valve wherein the gate may be easily and effectively brought into sealing engagement when the gate is in open or closed position.

A still further object is to provide a valve having a gate making sealing engagement with the seat when in open or closed position and at the same time a gate which is self-unseating when the gate moving mechanism is actuated to move from one position to another.

A further object is to provide a valve that is simple, easy to make, and will, with continued use, be easily and effectively operated.

Still another object is to provide a valve having a composite gate in which valve wedges are loosely connected to and driven by an interposed driving block.

A further object is to provide an improved valve in which the wedge blocks of a composite gate are driven into sealing engagement with the seats during terminal movement of the gate.

The preferred embodiment, by means of which other objects, together with the above objects, are obtained is hereinafter described in connection with the drawing, in which:

Fig. 1 is a vertical sectional view of a valve embodying the invention.

Fig. 2 is a perspective view, partly in section, showing, in spaced relation, the elements of the composite gate of the valve illustrated in Fig. 1.

Fig. 3 is a plan view taken on the line 3—3 of Fig. 1.

Fig. 4 is a section through the composite gate, as assembled, and taken approximately on line 4—4 of Fig. 2.

In the drawing, 1 designates a valve casing which is provided with attaching flanges 2 and a transverse passage 3 for the flow of fluid to be controlled by the valve. A central chamber 4 extends transversely above and below the passage 3. The lower end of the chamber 4 is closed by a wall 5 while at the upper end the casing is flanged at 6 and is drilled and tapped to receive bolts 7 which secure the cap plate 8 thereon to close the valve. The cap plate 8 has a central boss 9 orificed at 10 to pass the threaded portion 11 of valve stem 12, the boss being threaded externally to threadably receive a cap 13 which has an inner recess 14 to receive flange 15 on valve stem 12. The valve stem 12 is thus rotatably mounted upon the valve casing but is restrained from axial movement therein.

The walls of chamber 4 are provided with annular recesses 20 about passage 3 to receive flanges 21 on seat plates 22, which extend downwardly at 23 and 24 into the lower portion of chamber 4. The valve member or the gate is generally designated as 25 and comprises complemental valve wedges 26 and 27 having oppositely inclined inner surfaces 28 and 29 contacting the respective faces of an interposed driving block 30. Valve wedges 26 and 27 and driving block 30 are provided with openings 31, 32 and 33 which are in alined relation with each other and with passage 3 in casing 1 when the valve is open as illustrated in Fig. 1.

An important feature of the invention is the construction and function of composite gate 25. The gate, as is well known, is designed to move transversely of the passage 3 of the valve to open and close that passage. This movement is effected by the operation of handwheel 34 and valve stem 12, which is operatively connected through coarse threads 11 on the valve stem to a driving shank 40 which is in turn operatively connected to the gate 25.

Shank 40 is of special construction to effectively transmit motive power to the gate during movement thereof and to hold the gate in sealing relation with seat plates 23 and 24 when the valve is in either open or closed position. By reference to Fig. 2 it will be noted that the upper end of the driving block 30 is slotted centrally at 41, the slot terminating at its lower end with a cylindrical enlargement 42. The shank 40 is formed from an elongated flat bar, of which the lower end is of cylindrical contour to slidingly fit within the enlargement 42 of the driving block 30 while the upwardly extending portion of the shank is of such width as to enter the upper portion of slot 41. The shank 40 is also provided with a central threaded bore of such length that its cooperation with the threaded portion 11 of valve stem 12 will permit the desired movement of gate 25 to its extreme positions.

As driving block 30 is inclined relative to the shank 40 and the two members are of approximately the same thickness, valve wedge 27 is grooved at 45 to permit the proper positioning and free movement of the shank within the gate unit.

A drive connection between the driving block 30 and the valve wedges 26 and 27 is provided by means of pins 46 fixed in the driving block and having ends extending into elongated openings 47 and 48 in the inclined faces 29 and 28, respectively, of the valve wedges. The openings 47 and 48 are in substantially opposed mating relation when the valve wedges are likewise in superposed mating relation upon driving block 30.

Mounted upon the thick ends of wedge blocks 26 and 27 are U-shaped springs 50 which are secured in place upon the respective valve wedges by cap screws 51. The outer ends of springs 50 extend across the driving block 30 and are curved inwardly to exert pressure upon the ends of the adjacent block. These springs are of such configuration as to normally force the wedge blocks into a relatively biased position, as best seen in Fig. 4. The amount of biasing of the wedge blocks is determined by the length of the elongated openings 47 and 48 and the limit of biasing is reached when pin 46 contacts the opposite ends of the elongated openings. It will also be noted by reference to Fig. 4 that the opening 33 in valve wedge 27 is out of register with the openings 31 and 32 in valve wedge 26 and driving block 30 and that the thickness of the gate 25 between faces 52 and 53 of the gate assembly is a minimum. Hence, the assembly as illustrated in Fig. 4 reveals the relative position of parts when the gate travels between its extreme positions.

In the operation of the valve to open position, illustrated in Fig. 1, an upper cap screw 51 engages cap plate 8 when the opening 33 in valve wedge 27 reaches a mating relation with passage 3 in the valve casing and as final position of the gate assembly is approached. Further operation of the handwheel 34 causes the driving block 30 and valve wedge 36 to move upwardly in unison whereby the gate assembly is expanded so that valve faces 52 and 53 make sealing engagement with seat plates 23 and 24, and openings 31 and 32 are likewise moved to complete a thorough and unobstructed passage in the valve. It is thus apparent that there is a sealing engagement of the valve gate with the seat plates when the valve is open and at the same time the inclined faces of valve wedges 26 and 27 are forced into sealing engagement with the faces of the driving block 30 whereby fluid flow is confined entirely to the completed passage 3 through the valve.

When the valve above described is to be closed, initial movement of handwheel 34 causes a downward movement of driving block 30. By virtue of the pressure exerted by springs 50 tending to bias valve wedge 26 relative to valve wedge 27, the wedge block 26 will follow the driving block in its downward movement and self-unseating of the gate from the seat plates will occur. The gate 25 will then move freely until the lower limit of movement is approached when the head of lower cap screw 51 will engage the bottom wall 5 of chamber 4, whereupon expansion of the gate will again take place during terminal movement of handwheel 34, and the solid portion of faces 52 and 53 will be sealed with seat plates 23 and 24 to effectively close the valve to fluid flow through the valve or into the chamber against which the gate moves.

What is claimed is:

1. A valve mechanism comprising a valve casing having transverse openings therein, a valve chamber within said casing and extending transversely of said openings, a sliding gate within said chamber, said gate comprising opposed wedge shaped sections having their outer faces in parallel planes and their inner faces in spaced, inclined, parallel planes, spring means secured to one of said sections and contacting the adjacent end of the other section whereby the sections are urged to relatively biased position, pairs of elongated openings in the inner faces of the wedge section in opposed staggered relation, a driving block between the wedge shaped sections, pins fixed in said driving block and extending outwardly into the opposed, elongated openings, and a valve stem having driving engagement with said block, whereby the gate is moved into closed and open positions and expanded into sealing engagement with the walls of the valve chamber in such positions.

2. A valve mechanism comprising a valve casing having transverse openings therein, a valve chamber within said casing and extending transversely of said openings, a sliding gate within said chamber, said gate comprising opposed wedge shaped members having their outer faces in parallel planes and their inner faces in spaced, inclined, parallel planes, spring means secured to one of said members and contacting the adjacent end of the other member whereby the members are urged to relatively biased position, pairs of elongated openings in the inner faces of the wedge member in opposed staggered relation, a driving block member between the wedged shaped members, rigid pins on said block member, said elongated openings being disposed to receive said pins and permitting a limited longitudinal movement between said members, and a valve stem having driving engagement with said block member, whereby the gate is moved into closed and open positions and expanded into sealing engagement with the walls of the valve chamber in such positions.

3. A valve including a housing having a passage therethru to be closed, a valve chamber in said housing, a valve member comprising two opposed wedge sections to seal with the chamber wall, a wedge face on the inner side of each section, a driving block having faces one of which is in contact with the inner face of each section, a lost motion connection between said block and each section, and means to move said block to slide relative to one section to seal the valve member in open position and to slide relative to the other section to seal in closed position.

4. A valve including a housing having a passage therethru to be closed, a valve chamber in said housing, a valve member comprising two opposed wedge sections to seal with the chamber wall, a wedge face on the inner side of each section, a driving block having faces one of which is in contact with the inner face of each section, a lost motion connection between said block and each section, means to move said block to slide relative to one section to seal the valve member in open position and to slide relative to the other section to seal in closed position, and spring means to urge said sections to a relatively biased position.

SAM SORENSEN.